United States Patent [19]
Goetz et al.

[11] Patent Number: 5,784,638
[45] Date of Patent: Jul. 21, 1998

[54] COMPUTER SYSTEM SUPPORTING CONTROL TRANSFERS BETWEEN TWO ARCHITECTURES

[75] Inventors: John Wallace Goetz, Jericho; John Michael Keaty, Shelburne; Stephen William Mahin, Underhill, all of Vt.

[73] Assignee: International Business Machines Corporation, Armonk, N.Y.

[21] Appl. No.: 605,409

[22] Filed: Feb. 22, 1996

[51] Int. Cl.⁶ .................................................. G06F 9/00
[52] U.S. Cl. ............................... 395/800.43; 395/500
[58] Field of Search .......................... 395/800.43, 376, 395/500, 653, 527

[56] References Cited

U.S. PATENT DOCUMENTS

| | | | |
|---|---|---|---|
| 4,370,709 | 1/1983 | Fosdick | 395/500 |
| 4,514,803 | 4/1985 | Agnew et al. | 395/500 |
| 5,247,520 | 9/1993 | Giese et al. | 395/500 |
| 5,280,589 | 1/1994 | Nakamura | 395/309 |
| 5,301,325 | 4/1994 | Benson | 395/707 |
| 5,430,862 | 7/1995 | Smith | 395/500 |
| 5,452,456 | 9/1995 | Mourey | 395/653 |
| 5,481,693 | 1/1996 | Blomgren | 395/566 |
| 5,542,059 | 7/1996 | Blomgren | 395/800.41 |
| 5,574,927 | 11/1996 | Scantlin | 395/800.41 |
| 5,598,546 | 1/1997 | Blomgren | 395/800.43 |

*Primary Examiner*—Eric Coleman
*Attorney, Agent, or Firm*—Schmeiser, Olsen & Watts; Eugene I. Shkurko

[57] ABSTRACT

A computer system supports control transfers between two architectures with different address ranges and/or different methods of calling programs which involve passing parameters, stack pointers and return addresses. Control is transferred between the architectures through a control transfer mode bit.

42 Claims, 10 Drawing Sheets

OLD STACK BEFORE CALL

FIG. 6
PRIOR ART

NEW STACK AFTER CALL

OLD STACK AFTER RETURN

DATA SEGMENT DESCRIPTOR

| BASE 31:24 | G | B | A V L | SEG LIMIT 19:16 | P | D P L | | O | E | W | A | BASE 23:16 | UPPER DWORD |
|---|---|---|---|---|---|---|---|---|---|---|---|---|---|
| BASE 15:0 | | | | | | | | | | | | SEG LIMIT 15:0 | LOWER DWORD |

*FIG. 9*

CODE SEGMENT DESCRIPTOR

| BASE 31:24 | G | D | A V L | SEG LIMIT | P | D P L | 1 | 1 | C | R | A | BASE 23:16 | UPPER DWORD |
|---|---|---|---|---|---|---|---|---|---|---|---|---|---|
| BASE 15:0 | | | | | | | | | | | | SEG LIMIT 15:0 | LOWER DWORD |

COMPUTER SYSTEM SUPPORTING CONTROL TRANSFERS BETWEEN TWO ARCHITECTURES

BACKGROUND OF THE INVENTION

1. Technical Field

The invention relates generally to control transfers in computer systems, and, more particularly, to computer system control transfers between two different computer architectures.

2. Background Art

More recent computer architectures typically perform at a much higher capacity than their older counterparts. For example, the focus on RISC processor architecture has produced implementations that have clear performance superiority over their CISC counterparts, including the x86 CISC architecture. However, the vast amount of software written for the older architectures such as the x86 architecture stands as a major obstacle to acceptance of newer processors in the marketplace as it takes a great deal of time, money and risk to move this software base to new architectures. Many RISC processor and system vendors are attempting to accelerate the migration of the x86 legacy software to their products by emulating the x86 architecture in software.

Two significant drawbacks exist with the software emulation approach: 1) software emulation requires a high investment in memory needed to hold the emulator and emulated program and 2) software emulation is inherently slow. Current software emulation techniques yield performance at the low-end of the previous generation of x86 processors and typically require 16 Meg worth of physical memory.

One solution to the problem of speed in software emulation is using two or more microcontrollers in parallel processing. U.S. Pat. No. 4,370,709, "Computer Emulator With Three Segment Microcode Memory And Two Separate Microcontrollers For Operand Derivation And Execution Phases," (issued January 1983 to Fosdick and assigned to Tracor, Inc), describes several self-contained microcontrollers, which emulate the instructions of a larger macro-controller by breaking the macro-instructions down into two phases, where one micro-controller breaks the macro-instruction into the two phases and then delegates and controls two other micro-controllers to operate on each of the two phases. Unfortunately, this system could become very costly since more computer hardware is required and a high investment of physical memory is still needed for the emulation program and emulator.

Other examples of computing systems which support software program translation or emulation between multiple architectures are U.S. Pat. No. 5,280,589, "Memory Access Control System For Use With As Relatively Small Size Data Processing System," (issued January 1994 and assigned to Kabushiki Kaisha Toshiba); U.S. Pat. No. 4,514,803, "Methods For Partitioning Mainframe Instruction Sets To Implement Microprocessor Based Emulation Thereof," (issued April 1985 and assigned to IBM); and U.S. Pat. No. 5,247,520, "Communications Architecture Interface," (issued September 1993 and assigned to IBM). All of the patents above are hereby incorporated herein by reference.

The computer systems disclosed above may allow for some communication to take place between different architectures but do not allow for communications between architectures with different addressable lengths. In the case of the PowerPC and the x86, the x86 architecture as currently defined is a 32-bit architecture while the PowerPC is both 32-bit and 64-bit. This means that the 32-bit x86 code must be able to return to 64-bit PowerPC space to facilitate a successful control transfer. Furthermore, the aforementioned patents still require a substantial use of memory, whether internal or external, thus hindering the speed of the processors. Specifically, the x86 compatibility normally requires use of the process stack in memory for transferring parameters and process return information. Use of the process stack hurts performance because it requires data to be stored in and then loaded from memory, an often slow process.

SUMMARY OF THE INVENTION

It is thus an advantage of the present invention to provide a computer system where program control transfers take place between processor architectures with different address ranges and linkage methods (i.e. the methods of passing parameters, stack pointers and return addresses).

It is another advantage of the invention to provide a computer system which does not require use of the process stack in memory for transferring parameters and process return information.

It is yet another advantage of the invention to provide backward compatibility with the x86 legacy applications or any other similar applications used in transfer controls.

The foregoing and other objects of the inventions are realized by a microprocessor which transfers program control between multiple architectures, for example RISC and x86 CISC, by using a bit in a descriptor table entry to describe whether or not the target return segment contains software from the first architecture or the second architecture. Registers used for the linkage methods int he first architecture, but not previously defined by the second architecture, are used by the second architecture to hold excess work bits, allowing for architectures of different word lengths. Furthermore, the stack pointer and return address of the calling program is left in registers rather than in memory, improving the performance of the control transfer.

BRIEF DESCRIPTION OF DRAWINGS

The foregoing and other objects, features and advantages of the invention will be more apparent upon review of the detailed description of the best mode for carrying out the invention, as rendered below. In the description to follow, reference will be made to the accompanying drawings, in which.

DETAILED DESCRIPTION OF THE BEST MODE FOR CARRYING OUT THE INVENTION

Figure 1:
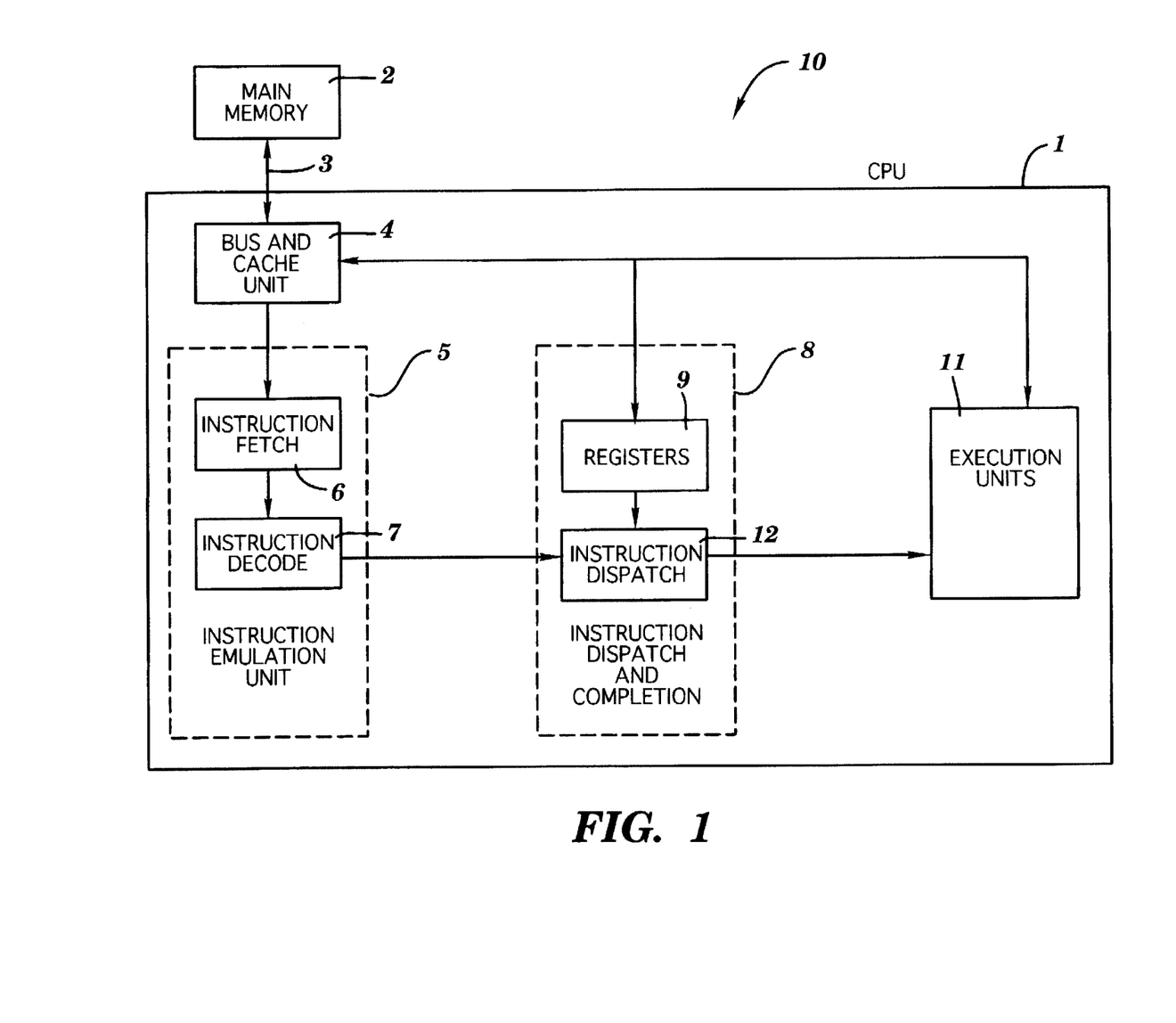
FIG. 1 is a block diagram illustrating the computer system of the present invention.

With reference to FIG. 1, the overview of the computer system 10 used for the invention is shown. A single microprocessor such as a central processing unit (CPU) 1 communicates via a bus 3 to main memory 2. During control transfers, the CPU 1 reads and writes elements from and to main memory 2 or, as described hereinbelow, from and to registers 9. The CPU 1 comprises a bus and cache unit 4, execution units 11, an instruction emulation unit 5, and instruction dispatch and completion unit 8. The instruction emulation unit 5 contains an instruction fetch block 6 for fetching instructions at the proper location and an instruction decode 7 wherein the instructions are decoded. Registers 9 and an instruction dispatch block 12 form the instruction dispatch and completion unit 8.

Figure 2:
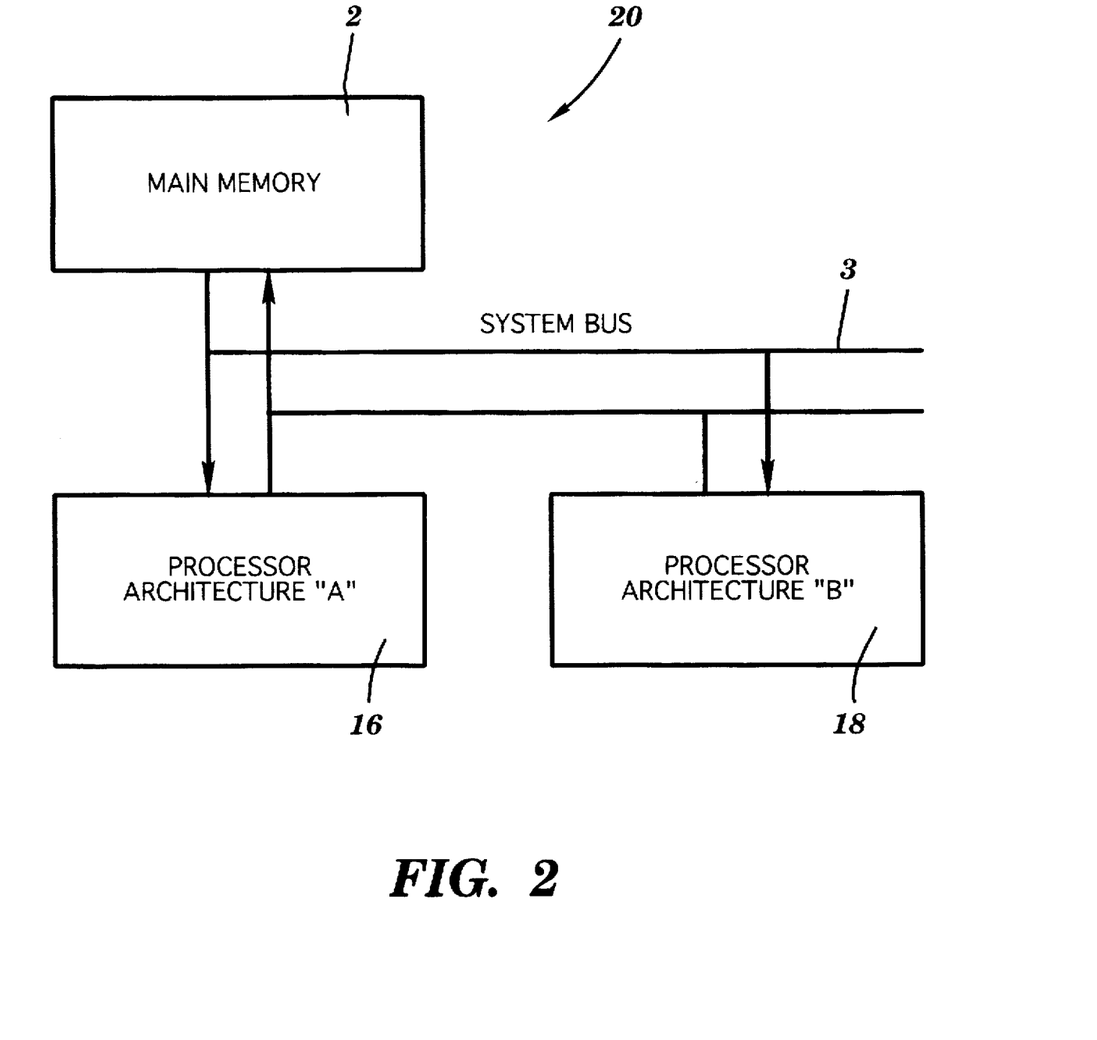
FIG. 2 illustrates a computer system of the present invention utilizing separate processors for each architecture.

It should be obvious to one skilled in the art that the invention can also be employed in a system utilizing multiple microprocessors, each capable of one architecture, rather than a single microprocessor capable of two or more architectures as depicted in FIG. 1. An example of a computer system 20 with multiple microprocessors is shown in FIG. 2. The microprocessors 16 and 18 would communicate via an external bus 3 such that control transfer information could be sent directly to the other architecture microprocessor rather than to stacks in main or external memory 2 based on the state of the new CTM bit. The microprocessors 16 and 18 comprise essentially the same elements as the microprocessor 1 shown in FIG. 1.

Figure 3:
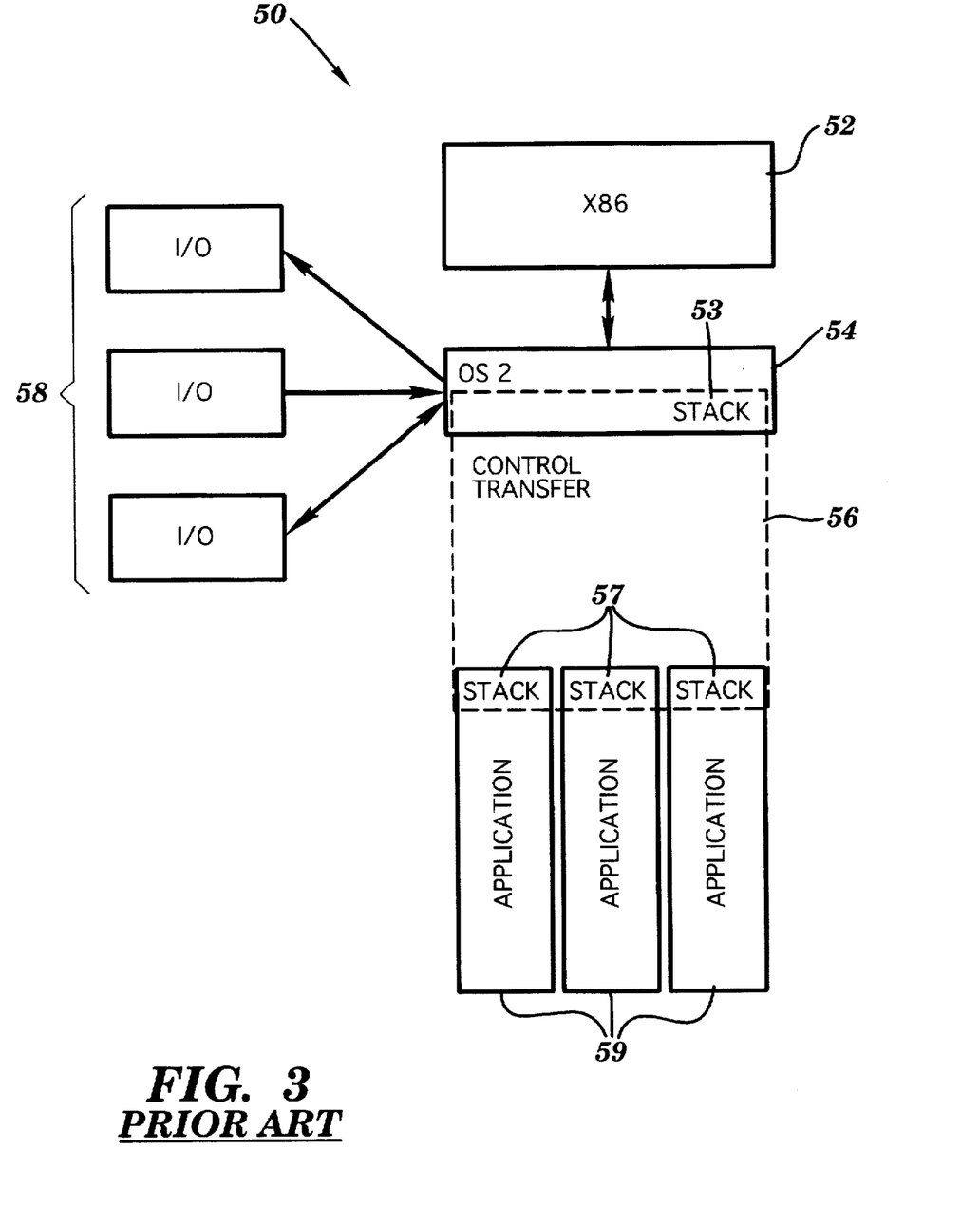
FIG. 3 diagrammatically illustrates aspects of a prior art computer system.

Referring to FIG. 3, a typical microprocessor system 50 is shown, including application programs 59, an operating system program 54, program control transfer 56 between the programs and stack data information 53 and 57. The operating system 54 is normally employed such as IBM's OS2. The operating system 54 supports one or more user programs called applications 59. Applications 59 communicate with system resources and other programs by performing a Control Transfer function which is initiated by a program Call or system Call instruction. The called program can return to the calling program by initiating a control transfer by using a Return instruction. This system typically executes in a single architecture environment.

Figure 4:
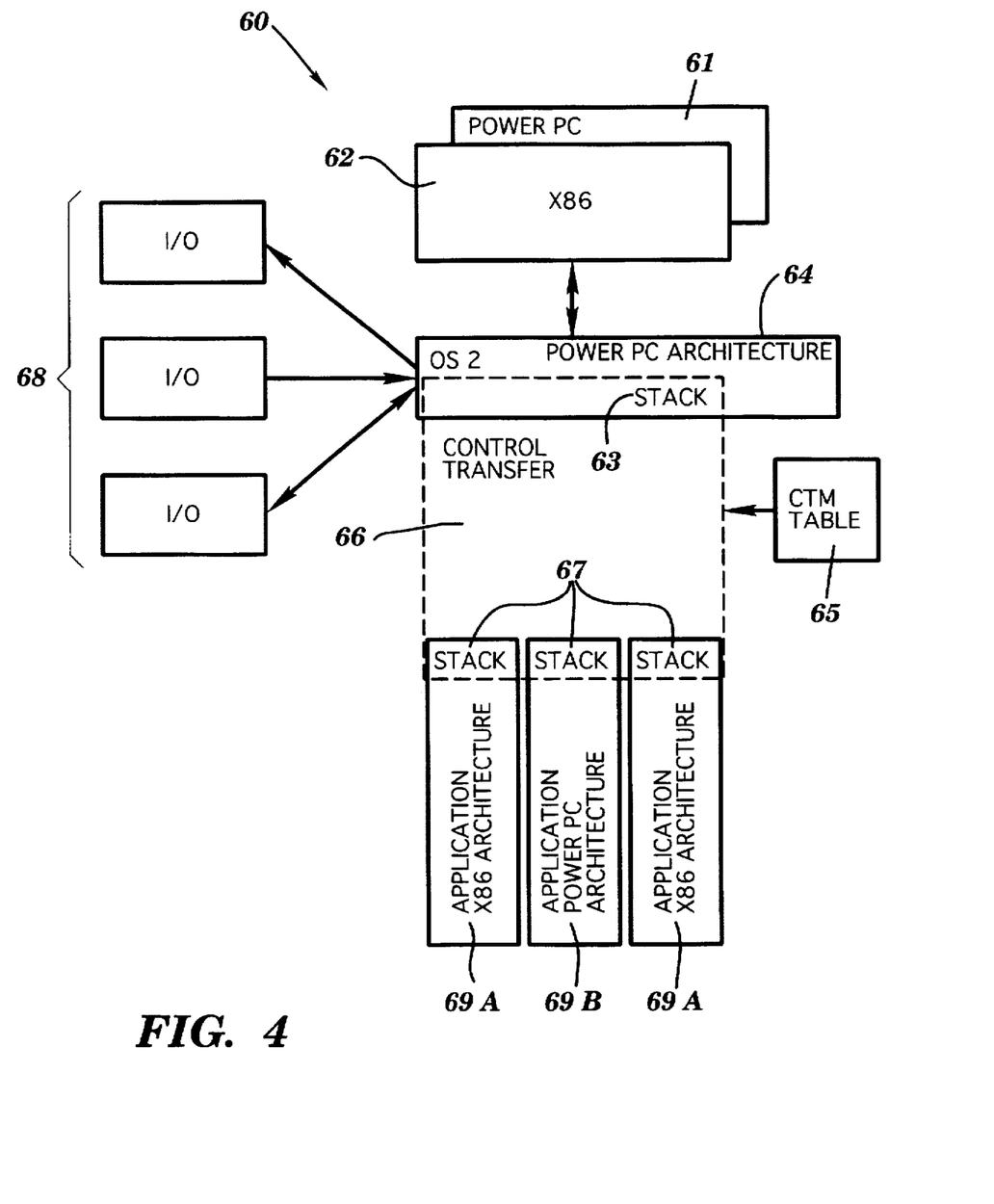
FIG. 4 diagrammatically illustrates aspects of a computer system supporting one or more program architectures according to the present invention.

Referring now to FIG. 4, the present invention's computer system 60 is shown. Again, there is an operating system 64 and one or more application programs 69. In this case, however, there are two architectures 61 and 62 present. The first architecture is x86 which is an example of a CISC architecture 62. The second architecture in this example is PowerPC architecture 61. Though these two architectures are shown and described, this invention is not limited to PowerPC, x86, RISC or CISC architectures. Each application program 69A and 69B and the operating system program has an associated entry in the CTM Table 65. The CTM entry of a program indicates to the control transfer hardware 66 which architecture, 61 or 62, is being invoked during a control transfer. In the example, the OS2 operating system 64 in PowerPC architecture may execute a Call instruction to an x86 application. Each program must have the CTM set correctly for its architecture. The program (or software) can explicitly read the CTM bit of the called program to determine what information needs to be transferred and whether to transmit it via registers, bus or memory.

Figures 5, 6, 7:
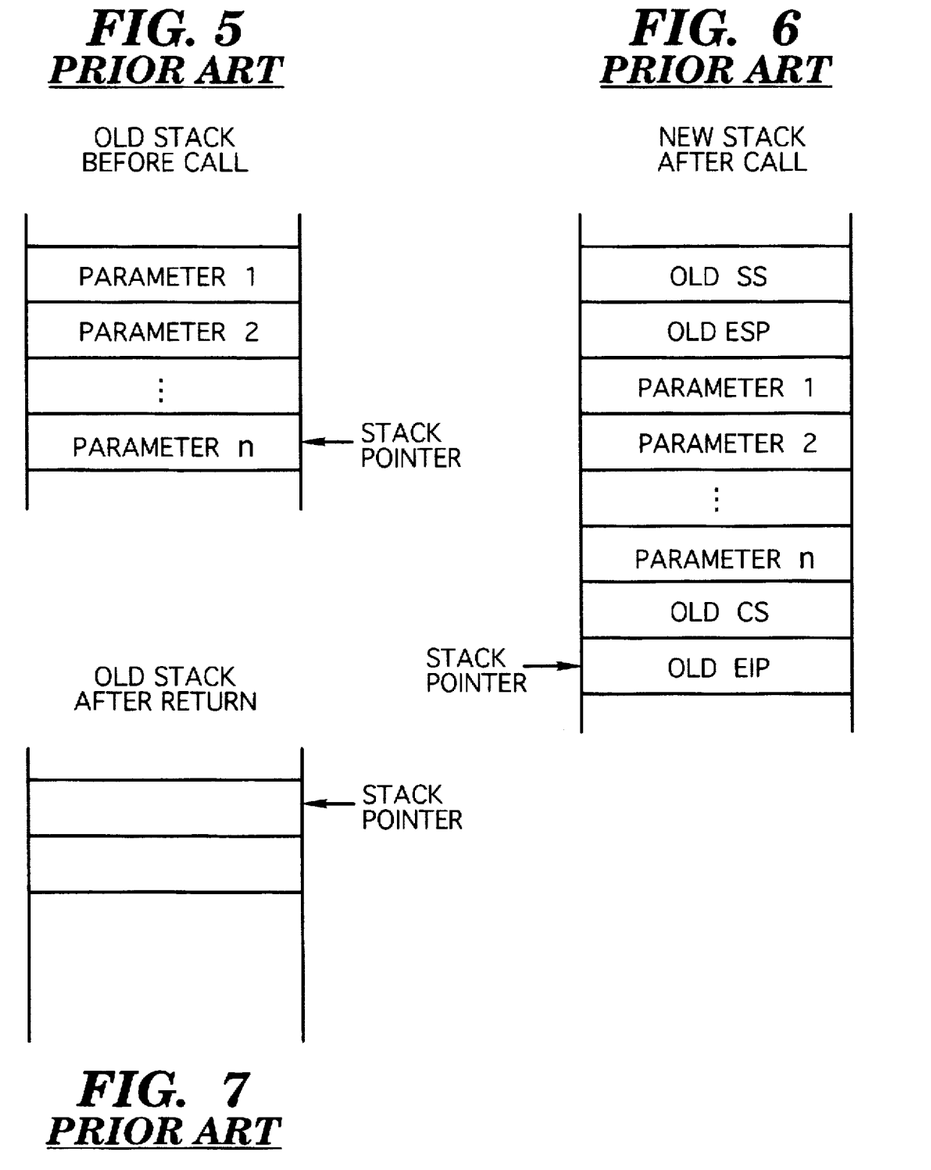
FIGS. 5, 6 and 7 illustrate prior art x86 process stacks.

FIGS. 5-7 illustrate how the x86 architecture defines the structure of a process stack before, during and after an interlevel control transfer. Although specific references are made to IBM's PowerPC RISC and x86 CISC processor architectures, it will be obvious to one skilled in the art that the present invention may be practiced without these specific details and in other processor architectures when designing multiple-architecture processors.

Figure 13:
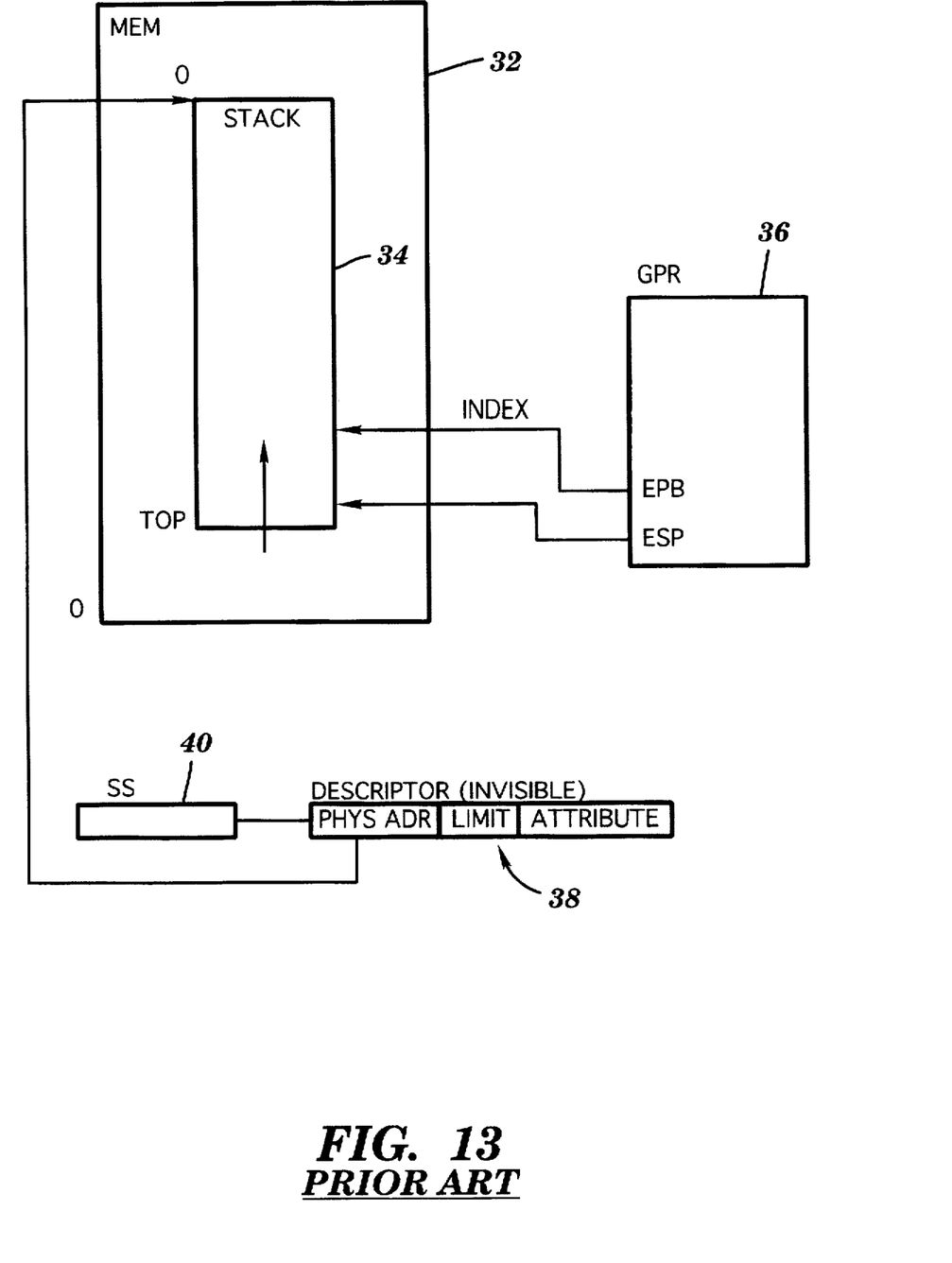
FIG. 13 illustrates the prior art x86 process stack addressing mechanism.

Prior to making a control transfer, the calling program will place the parameters (up to 32-bits worth) into its process stack, as depicted in FIG. 5. As shown in FIG. 13, the location of the x86 stack 34 in memory 32 is defined by the stack pointer SS.ESP, where SS 40 is the stack segment register and ESP 36 is the general purpose register holding the offset into the stack from the stack's base address. The base address of the stack is contained in the stack's descriptor 38 which is referenced by the selector SS. The descriptor 38 contains the physical address, the limit and attributes of the stack.

As shown in FIG. 6, when the x86 program calls another x86 program several items are pushed onto the called program's stack. The term "old" refers to the program executing before the control transfer and "new" refers to the program executing as a result of the control transfer. First the calling program's stack pointers, (SS and ESP), are pushed onto the new stack, followed by the parameters from the old stack. Finally, the next instruction address pointers of the calling program, (CS and EIP), are pushed onto the stack. CS is the code selector register and EIP is the register holding the offset into the code segment from the code segment base address. The base address is contained in the code descriptor referenced by the selector CS. Note that the SS and ESP registers are updated with the location of the new stack, and the CS and EIP registers are updated with the address of the called program.

When the called program returns to the caller, the old CS and EIP values are popped off the new stack and used to update the CS and EIP registers with the return address. The old SS and ESP values are also popped off the stack, decremented by the number of bytes passed as parameters when the call took place originally, and used to update the SS and ESP registers to be used by the calling program. FIG. 7 shows the final state of the old stack after the return.

The process of passing parameters, stack pointers and return addresses in this fashion can be collectively called the x86 linkage method or convention.

Since the PowerPC architecture does not explicitly define a stack convention for program control transfers, a PowerPC operating system may define any convention it sees as being optimal for the work it needs to accomplish. An artifact, however, is that a control transfer from PowerPC to x86 requires the calling PowerPC program to adhere to the x86 linkage convention. Therefore, such a call requires the PowerPC program to build the process stack for the called x86 program directly, even though the old stack never existed since the PowerPC program does not need a process stack of its own. Technically, the old stack pointer (SS.ESP) does not have to be placed in the new process stack since the PowerPC architecture does not define an SS or ESP register.

Since the old SS.ESP value does not have to be placed in the stack for PowerPC calls, this invention redefines the purpose of that location to solve the problem of returning to 64-bit address space from 32-bit x86 software or in any situation where the address range of one architecture is greater than the address range of a second architecture. Referring again to FIG. 6, when a call is made from PowerPC code to x86 code, the PowerPC code will place the upper 32-bits of the 64-bit return address into the location reserved for the old ESP in x86 to x86 control transfers. The lower 32-bits of the return address are placed into the old EIP location. These address elements are placed in the stack via the CPU-memory bus 3 (FIG. 1). When the x86 program returns to the PowerPC program, the processor hardware will pop the upper and lower return addresses from their locations on the x86 process stack, again via the bus 3. The bus unit 4 will transfer the two elements to the instruction emulation unit 5 which concatenates them to form a single, 64-bit address. This 64-bit address is then used by the instruction fetch block 6 to begin fetching instructions at the new location, effectively transferring control back to the PowerPC program.

Figure 8:
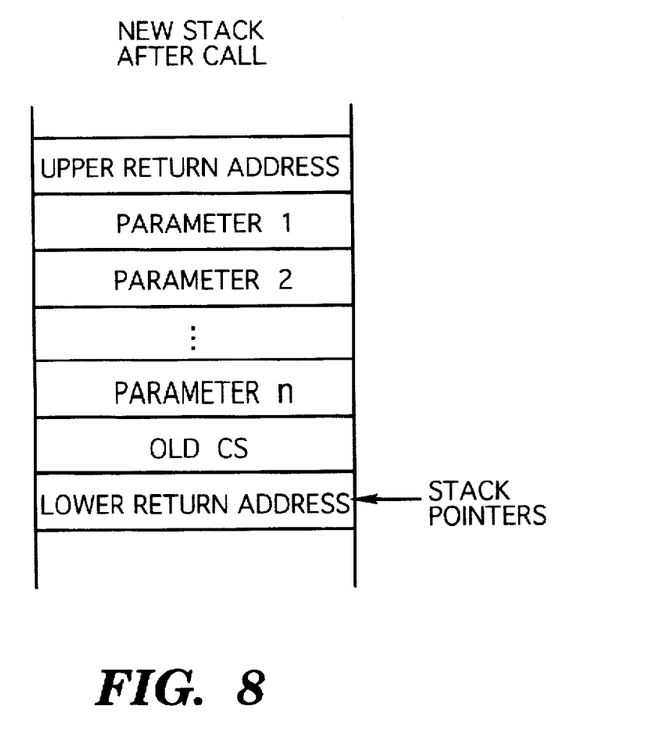
FIG. 8 illustrates a redefined process stack of the present invention.

FIG. 8 shows the redefined process stack after a PowerPC program calls an x86 program (the "new" stack after call).

Figure 9:
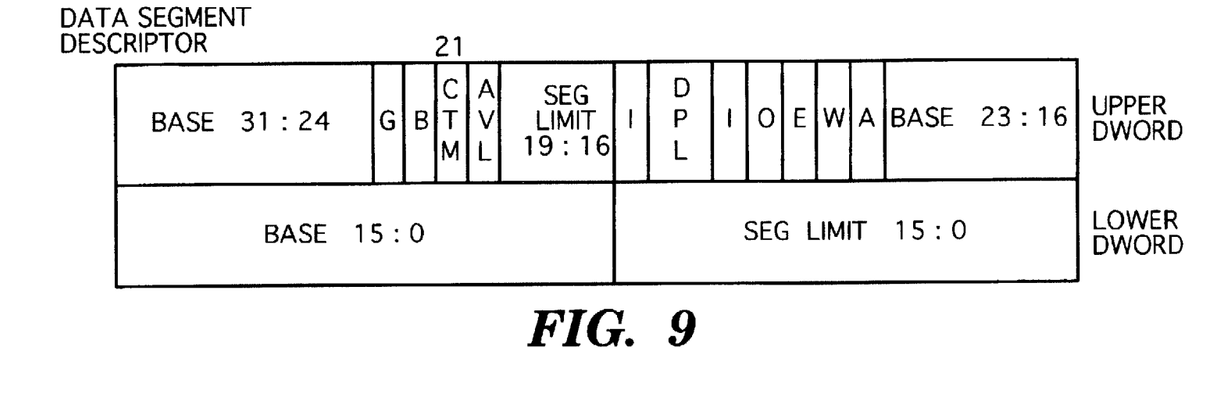
FIGS. 9, 10 and 11 illustrate identification information of the present invention.
Figure 10:
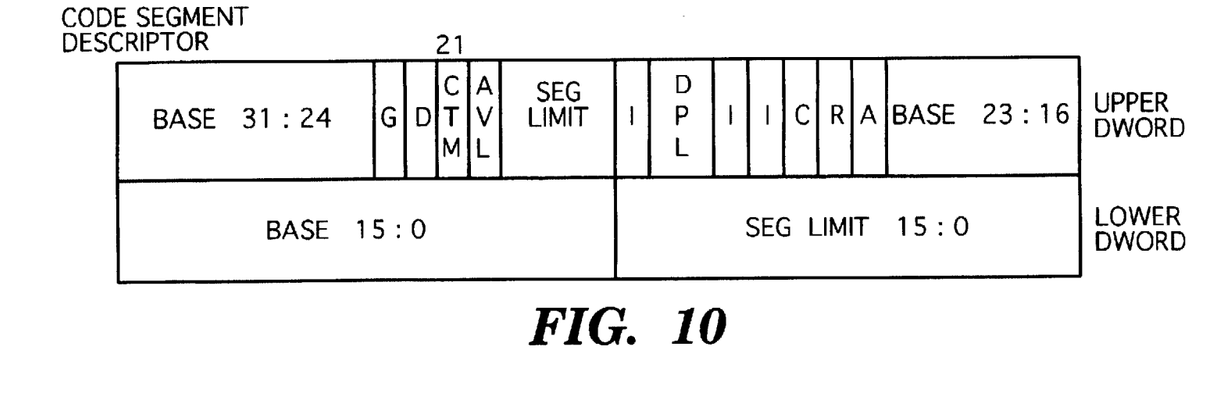
Figure 11:
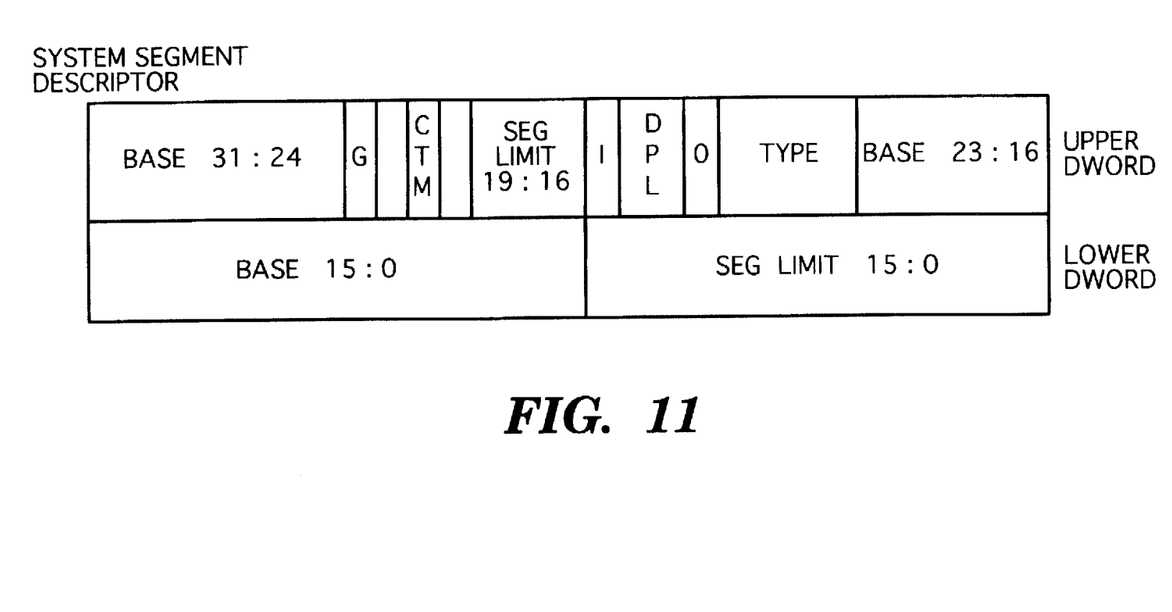

With the invention described above, the processor hardware now must decide which of two mechanisms it uses when returning from an x86 program to the calling program. In effect, it must be told by the software whether or not the calling program is PowerPC or x86. The hardware accomplishes this by examining an old CS descriptor when performing the return. Those knowledgeable in the x86 architecture know that the old CS selector value references a descriptor in main memory which is loaded by the processor when the CS selector is loading into the CS register from the process stack. The descriptor table entry contains information about the segment in memory referred to by the CS selector. One of the bits in this descriptor entry is left undefined by the 32-bit x86 architecture, specifically bit position 21 of the upper 4 bytes (doubleword) of the descriptor. This invention defines bit 21 of the upper doubleword as describing whether or not the associated segment contains standard x86 software (a zero in this bit) or PowerPC software (a one in this bit). Bit 21 will hereinafter be referred to as the control transfer mode bit. FIGS. 9, 10 and 11 show the layout of the three basic segment descriptors in the x86 architecture: namely the data segment descriptor, the code segment descriptor and the system segment descriptor. The location of the control transfer mode bit 21 is also shown.

Therefore, an x86 return to PowerPC will cause the processor hardware to read the old CS selector value from the process stack in main memory as well as its associated descriptor, also in main memory. The instruction emulation unit 5 (FIG. 1) will examine the newly defined control transfer mode bit to see what form of control transfer is taking place. If the mode bit is zero, a standard x86 control return takes place. If it is a one, the upper and lower 32-bits of the return PowerPC address are read from the process stack to form the full 64-bit return address. Control is then transferred to the instruction at this address.

A second aspect of this invention relates to control transfers from x86 programs to PowerPC programs. Again, since the PowerPC architecture does not define a fixed linkage convention, it is not restricted to that of the x86 architecture. The old x86 process stack will contain the parameters being passed to the PowerPC program, but there is no requirement that a new stack be built for the PowerPC program containing the parameters and old SS, ESP, CS, and EIP values. In fact, performance can be improved in x86 calls to PowerPC by leaving these values directly in processor registers rather than writing them to memory. Returns back to x86 from PowerPC can be improved with respect to performances by branching directly to the return address held in a register rather than having to read it from memory first.

Therefore, the second aspect of this invention is to leave the stack pointer and return address of the calling x86 program in registers rather than memory since the architecture of the called program, in this case PowerPC, is not bound by the linkage restrictions of the x86 architecture. Again, the processor must be able to distinguish an x86 to x86 control transfer from and x86 to PowerPC control transfer. This is accomplished when the processor examines the gate descriptor referenced by the instruction used to initiate the transfer (an x86 jump or call). Those knowledgeable in the x86 architecture are aware that the gate descriptor holds a selector pointing to the target code segment. The instruction emulation unit will read the code segment descriptor referenced by the selector in the gate descriptor, both of which are in main memory. After the code segment descriptor has been read by the instruction emulation unit, it will reference the control transfer mode bit to determine the type of transfer to take place. When this bit is zero, a normal control transfer takes place. When it is a one, a transfer to PowerPC code is taking place, so the return address and old stack pointer are left in processor registers rather than in memory. The registers defined to hold these values in this implementation are shown in FIG. 12.

Figure 12:
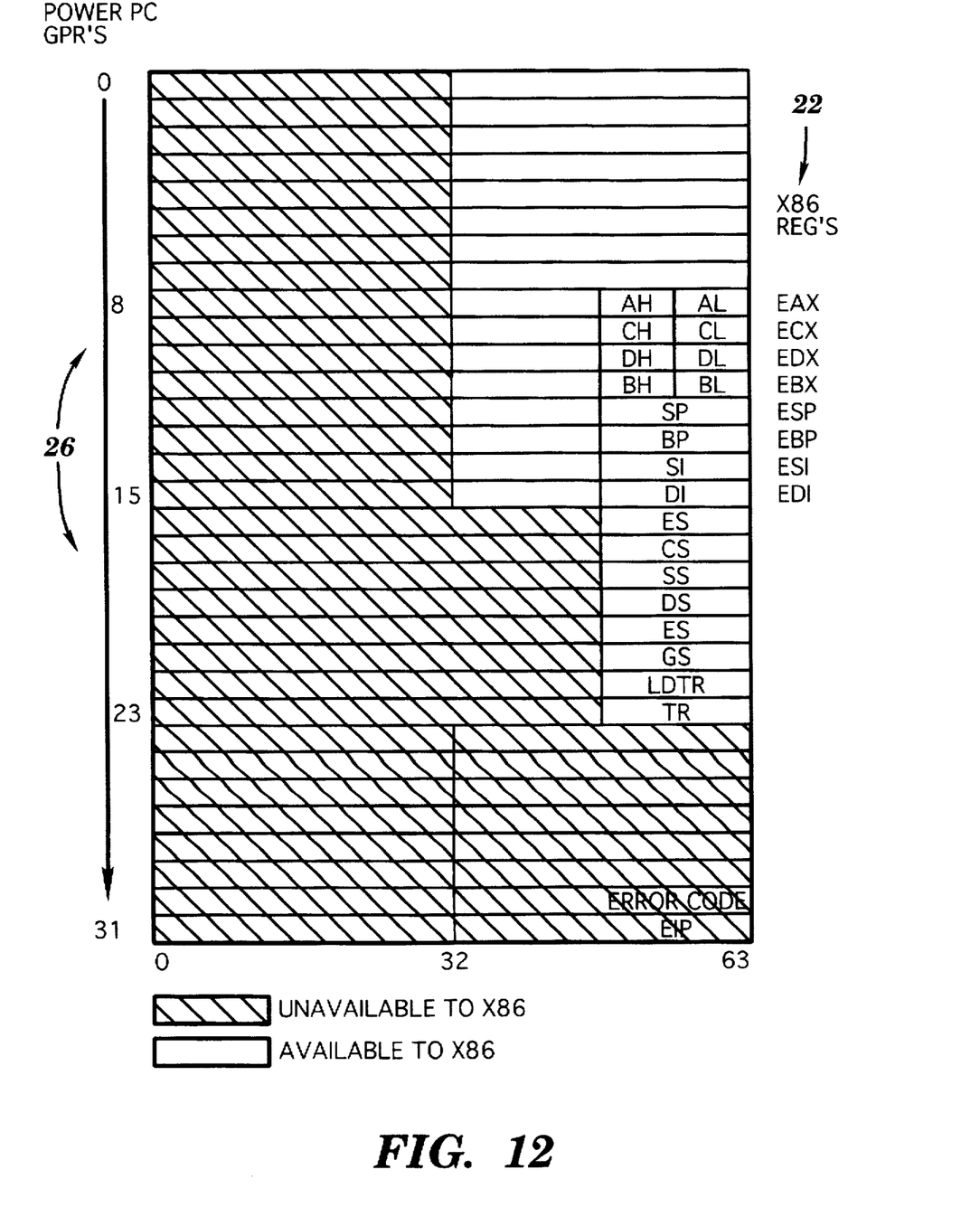
FIG. 12 illustrates registers of the present invention.

Referring to FIG. 12, it is shown how one might map x86 registers 22 to PowerPC general purpose registers 26. In this way, advantage is taken of the fact that PowerPC shown here has 32 8-byte registers, more than enough to hold x86 architecture registers as well as error codes associated with exception events. In FIG. 12, only the PowerPC registers used for x86 are shown. The shaded areas show registers that are not directly accessible by x86.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A microprocessor, comprising:
   (a) a first microprocessor architecture;
   (b) a second microprocessor architecture having a different linkage convention than said first microprocessor architecture;
   and
   (c) means for transferring program control between said first and second microprocessor architecture wherein architected information associated with said means for transferring program control is passed to the register of said first or second microprocessor architecture obtaining control.

2. A microprocessor according to claim 1, wherein said means for transferring said program control includes means for holding data of said first microprocessor architecture in registers when said data is not needed in memory by said second microprocessor architecture.

3. The microprocessor according to claim 2, wherein said means for holding data contains an offset of a base address of said microprocessor architecture relinquishing said program control.

4. The microprocessor according to claim 1, wherein said second microprocessor architecture further comprises means for emulating said first microprocessor architecture.

5. The microprocessor according to claim 1, wherein said means for transferring said program control comprises a field of information, said field indicating which of said first and second microprocessor architectures has said program control.

6. The microprocessor according to claim 5, wherein said field of information residing in an external memory is transferred by a bus to said microprocessor.

7. The microprocessor according to claim 5, wherein said field of information comprises one bit of information, the state of said bit indicating which of said first and second microprocessors architectures has said program control.

8. The microprocessor according to claim 1, wherein an address range of said second microprocessor architecture is greater than an address range of said first microprocessor architecture.

9. A microprocessor system according to claim 1, wherein said first microprocessor architecture is an x86 CISC architecture.

10. The microprocessor according to claim 9, wherein an upper portion of a return address of said second microprocessor architecture is mapped to a section in a process stack of said X86 CISC architecture reserved for an old stack pointer.

11. A microprocessor system according to claim 1, wherein said second microprocessor architecture is a PowerPC RISC architecture.

12. A method for transferring program control between a first and second processor architecture comprising the steps of:
 a) setting a state of a control transfer mode means according to an architecture of a program;
 b) using said state of said control transfer mode means to determine whether control transfer data will be passed in main memory or via hardware registers; and
 c) passing control transfer data between programs according to said state of said control transfer mode means, wherein a register of the first processor architecture is mapped to a register of the second processor architecture.

13. A method according to claim 12, wherein said control transfer mode means indicates said first or second architecture with one bit of information.

14. The method according to claim 12, wherein an address range of said first processor architecture is less than an address range of said second processor architecture.

15. The method according to claim 12, wherein step c) further comprises the step of:
 c1) mapping an upper portion of a return address of said second microprocessor architecture to a section of a process stack of said first microprocessor architecture reserved for an old stack pointer.

16. A method for transferring program control between first and second processor architectures in a microprocessor system including a microprocessor and an external memory connected to said microprocessor by an external bus, said microprocessor having a bus and cache unit coupled between said external memory, registers and an execution unit, said microprocessor being adapted to store a process stack into said registers to be operated upon by said microprocessor, said method comprising the steps of:
 a) indicating a transfer of said program control from said second processor architecture to said first processor architecture with a control transfer mode means;
 b) holding data of said second processor architecture in a holding means;
 c) transferring said control of said second processor architecture to said first processor architecture, wherein architected information is mapped to the register of said first processor architecture;
 d) returning said data of said second processor architecture from said holding means upon a transfer of said program control back to said second processor architecture.

17. The method according to claim 16 further comprising the step of:
 e) applying said control transfer mode means to said external memory via said external bus.

18. The method according to claim 16, wherein the step of transferring said program control from said second processor architecture to said first processor architecture comprises the steps of:
 c1) setting a state of said control transfer mode means according to the architecture of a program;
 c2) using the state of said control transfer mode means to determine whether control transfer data will be passed in external memory or via hardware registers; and
 c3) passing control transfer data between programs according to said state of said control transfer means.

19. A method according to claim 16, wherein said control transfer mode means indicates said first or second architecture with one bit of information.

20. The method according to claim 16, wherein an address range of said first processor architecture is less than an address range of said second processor architecture.

21. The method according to claim 16 further comprising the steps of:
 holding an offset of a base address of said first processor architecture in said holding means when said program control transfer means indicates said control transfer from said first processor architecture to said second processor architecture; and
 holding address bits of said second processor architecture in said holding means when said program control transfer means indicates said control transfer from said second processor architecture to said first processor architecture.

22. The method according to claim 16, wherein step c) further comprises the step of:
 c1) mapping an upper portion of a return address of said second microprocessor architecture to a section of a process stack of said first microprocessor architecture reserved for an old stack pointer.

23. A microprocessor system, including a microprocessor and an external memory, said microprocessor having a bus and cache unit coupled between said external memory, registers and an execution unit, said microprocessor being adapted to store a process stack into said registers to be operated upon by said microprocessor; said microprocessor system comprising:
 (a) a first microprocessor architecture;
 (b) a second microprocessor architecture having a different linkage convention than said first microprocessor architecture; and
 (c) means for transferring program control between said first and second microprocessor architecture wherein architected information associated with said means for transferring program control is passed to a register of said first or second microprocessor architecture obtaining control.

24. The microprocessor system according to claim 23, further comprising means for holding said linkage data from one of said first and second microprocessor architectures in registers when said linkage data is not needed in memory by the other of said architectures.

25. A microprocessor system according to claim 23, wherein said second microprocessor architecture further comprises means for emulating said first architecture.

26. The microprocessor system according to claim 23, further comprising means for transferring program control, said means for transferring program control including a control transfer mode field, said control transfer mode field indicating which of said architectures has said program control.

27. The microprocessor system according to claim 26, wherein said control transfer mode field is written to said external memory via an external bus by said microprocessor.

28. The microprocessor system according to claim 26, wherein said field comprises one bit of information, said one bit indicating which architecture has said program control.

29. The microprocessor system according to claim 23, wherein the address range of said second microprocessor architecture is greater than the address range of said first microprocessor architecture.

30. The microprocessor system according to claim 23, wherein said first microprocessor architecture is an x86 CISC architecture.

31. The microprocessor system according to claim 30, wherein an upper portion of a return address of said second microprocessor architecture is mapped to a section in a process stack of said X86 CISC architecture reserved for an old stack pointer.

32. The microprocessor system according to claim 23, wherein said second microprocessor architecture is a PowerPC RISC architecture.

33. A microprocessor system, including two or more microprocessors and a main memory, said microprocessor having a bus and cache unit coupled between said main memory, registers and an execution unit, said microprocessor being adapted to store a process stack into said registers to be operated upon by said microprocessor; said microprocessor system comprising:

(a) a first microprocessor architecture;
(b) a second microprocessor architecture; and
(c) means for transferring program control between said first and second processor architecture wherein architected information associated with said means for transferring program control is mapped to a register of said first or second architecture obtaining control.

34. A microprocessor system according to claim 33, wherein said transferring means includes holding data of said first architecture in registers when said information is not needed in memory by said second processor architecture.

35. The microprocessor system according to claim 33, wherein said second architecture further comprises means for emulating said first architecture.

36. A microprocessor system according to claim 33, wherein said means for transferring program control comprises a control transfer mode field, whereby said field indicates which microprocessor architecture has said program control.

37. A microprocessor system according to claim 36, wherein said field residing in said main memory is transferred to said microprocessor.

38. The microprocessor system according to claim 36, wherein said field comprises one bit of information, said one bit indicating which architecture has said program control.

39. The microprocessor system according to claim 33, wherein the address range of said second microprocessor architecture is greater than the address range of said first microprocessor architecture.

40. The microprocessor system according to claim 33, wherein said first microprocessor architecture is an x86 CISC architecture.

41. The microprocessor system according to claim 40, wherein an upper portion of a return address of said second microprocessor architecture is mapped to a section in a process stack of said X86 CISC architecture reserved for an old stack pointer.

42. The microprocessor system according to claim 33, wherein said second microprocessor architecture is a PowerPC RISC architecture.

* * * * *